United States Patent
Crombez et al.

(10) Patent No.: US 7,441,845 B2
(45) Date of Patent: Oct. 28, 2008

(54) METHOD FOR OPERATING MULTIPLE AXLE REGENERATIVE BRAKING IN AN AUTOMOTIVE VEHICLE

(75) Inventors: Dale S. Crombez, Livonia, MI (US); Michael J. Schneider, Bloomfield Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 785 days.

(21) Appl. No.: 10/939,575

(22) Filed: Sep. 13, 2004

(65) Prior Publication Data

US 2006/0055239 A1    Mar. 16, 2006

(51) Int. Cl.
    *B60T 8/64*    (2006.01)
(52) U.S. Cl. ...................................... 303/152
(58) Field of Classification Search ................. 303/152, 303/155, 167, 186; 701/71, 70, 22; 180/170, 180/65.1, 65.2, 65.3, 165, 197
See application file for complete search history.

(56) References Cited

U.S. PATENT DOCUMENTS

| | | | |
|---|---|---|---|
| 5,086,865 A | 2/1992 | Tanaka et al. | |
| 5,291,960 A | 3/1994 | Brandenburg et al. | |
| 5,839,533 A | 11/1998 | Mikami et al. | |
| 5,915,801 A | 6/1999 | Taga et al. | |
| 6,099,089 A | 8/2000 | Schneider | |
| 6,120,115 A * | 9/2000 | Manabe | 303/152 |
| 6,122,588 A | 9/2000 | Shehan et al. | |
| 6,155,365 A * | 12/2000 | Boberg | 180/65.2 |
| 6,176,808 B1 | 1/2001 | Brown et al. | |
| 6,325,470 B1 * | 12/2001 | Schneider | 303/152 |
| 6,406,105 B1 * | 6/2002 | Shimada et al. | 303/152 |
| 6,454,364 B1 * | 9/2002 | Niwa et al. | 303/152 |
| 6,488,344 B2 * | 12/2002 | Huls et al. | 303/152 |
| 6,663,197 B2 * | 12/2003 | Joyce | 303/152 |
| 6,687,593 B1 | 2/2004 | Crombez et al. | |
| 6,691,013 B1 * | 2/2004 | Brown | 701/70 |
| 6,719,379 B2 * | 4/2004 | Crombrez | 303/152 |
| 2004/0070270 A1 * | 4/2004 | Gunji | 303/152 |

\* cited by examiner

*Primary Examiner*—Robert A. Siconolfi
*Assistant Examiner*—Mariano Sy
(74) *Attorney, Agent, or Firm*—Dickinson Wright PLLC; David Kelley; Ray Coppiellie

(57) ABSTRACT

A system and method for maximizing the post-ABS regenerative braking capability of an automotive vehicle having regenerative braking available for more than one axle determines the availability of surplus regenerative braking capacity on a first axle and then uses the surplus, if any, to satisfy the brake demand for another axle having insufficient regenerative braking capacity. This system restores regenerative braking without causing the regenerative braking to trigger a subsequent ABS event.

9 Claims, 7 Drawing Sheets

METHOD FOR OPERATING MULTIPLE AXLE REGENERATIVE BRAKING IN AN AUTOMOTIVE VEHICLE

BACKGROUND OF THE INVENTION

1. Field of the Invention

The present invention relates to a system and method for providing maximum regenerative braking with a vehicle having regenerative braking capability installed on multiple axles.

2. Disclosure Information

Although regenerative braking has been used for many years with electro-drive vehicles, such usage has been primarily in the context of vehicles having but a single drive axle. The present invention is directed to provision of both regenerative and friction braking on all axles of a vehicle. This presents a particular challenge, coupled with an opportunity to increase the amount of regenerative braking. This must be accomplished seamlessly, without causing issues with respect to anti-lock braking of the vehicle. The inventors of the present invention have determined a method and system for achieving maximum regenerative braking with all axles of the vehicle participating in the regenerative braking.

SUMMARY OF THE INVENTION

A method for operating regenerative braking in an automotive vehicle having a plurality of axles includes the steps of determining the brake demand for a first axle, determining the availability of regenerative braking of the first axle to satisfy the brake demand, determining brake demand for a second axle, and determining availability of regenerative braking of the second axle to satisfy the braking demand for the second axle. In the event that the regenerative braking available for the first axle is greater than the brake demand for the first axle, and in the further event that the regenerative braking available for the second axle is less than the braking demand for the second axle, the surplus regenerative braking will be applied to the first axle in an amount not greater than the amount needed to satisfy the unmet braking demand for the second axle. The present method further comprises the step of applying friction braking to a second axle in the event that the surplus regenerative braking available with the first axle is insufficient to satisfy the braking demand of the second axle when combined with the regenerative braking available with the second axle.

The brake demand for the first axle and the brake demand for the second axle are determined according to inputs from a driver of the vehicle, and from balanced braking requirements. The availability of regenerative braking for an axle of the vehicle is determined by comparing at least one regenerative braking limit with the lesser of the brake demand for the axle and the maximum regenerative braking which may be achieved by the axle. At least one regenerative braking limit comprises the lesser of the maximum regenerative braking which may be achieved by the axle and a calculated maximum regenerative braking amount following the end of an antilock braking event. This calculated maximum post-ABS braking amount is set at first to a level which is equivalent to the brake torque which the axle achieved at the end of the ABS event. Thereafter, the post-ABS maximum regenerative braking may be increased by setting the post-ABS regenerative braking for any particular axle equal to the total braking on that particular axle at the time the post-ABS maximum value is reset.

According to another aspect of the present invention, a method for operating regenerative braking on an automotive vehicle having a plurality of axles further includes the steps of determining braking demand for a first axle of the vehicle, and determining the availability of regenerative braking of the first axle to satisfy the brake demand. Thereafter, the brake demand for a second axle and the availability of regenerative braking of the second axle to achieve braking demand for that axle as determined. In the event that the regenerative braking available for the second axle is greater than the brake demand for the second axle, and in the further event that regenerative braking available for the first axle is less than the braking demand for the first axle, surplus regenerative braking will be supplied to the second axle in an amount not greater than the amount needed to satisfy the unmet braking demand for the first axle. Then, friction braking will be applied to the first axle in an amount sufficient to satisfy the brake demand of the first axle in the event that the surplus regenerative braking available at the second axle is insufficient to satisfy the brake demand for the first axle when combined with the regenerative braking available with the first axle.

According to another aspect of the present invention, a control system for operating regenerative and friction brakes on a plurality of axles of an automotive vehicle includes a plurality of sensors for providing a plurality of outputs corresponding to a plurality of vehicle operating parameters, and a controller for receiving inputs from the plurality of sensors. An operating system housed within the controller determines the unique brake demand for each of the plurality of axles and determines the regenerative braking available for each axle. The controller applies regenerative braking to a first one of the axles in an amount greater than the brake demand for the first axle in the event that surplus regenerative capacity is present for the first axle, and insufficient regenerative braking is available to meet the brake demand for a second one of the axles. The controller applies friction braking to the second axle in the event that the sum of the first axle surplus regenerative capacity and the second axle regenerative braking is less than the brake demand for the second axle.

It is an advantage of the present invention that a method and system for operating regenerative brakes in a vehicle provides maximum capability to achieve regeneration of vehicle batteries, by taking advantage of the capability to increase braking on an axle where surplus regenerative braking capability is available.

It is a further advantage of the present invention that maximum regenerative braking may be achieved while minimizing operation in an anti-lock braking mode. In general, operation in anti-lock braking mode is undesirable because braking is usually achieved through the use of friction brakes, to the detriment of regenerative braking.

Other advantages, as well as objects and features of the present invention, will become apparent to the reader of this specification.

DETAILED DESCRIPTION OF THE PREFERRED EMBODIMENTS

Figure 1:
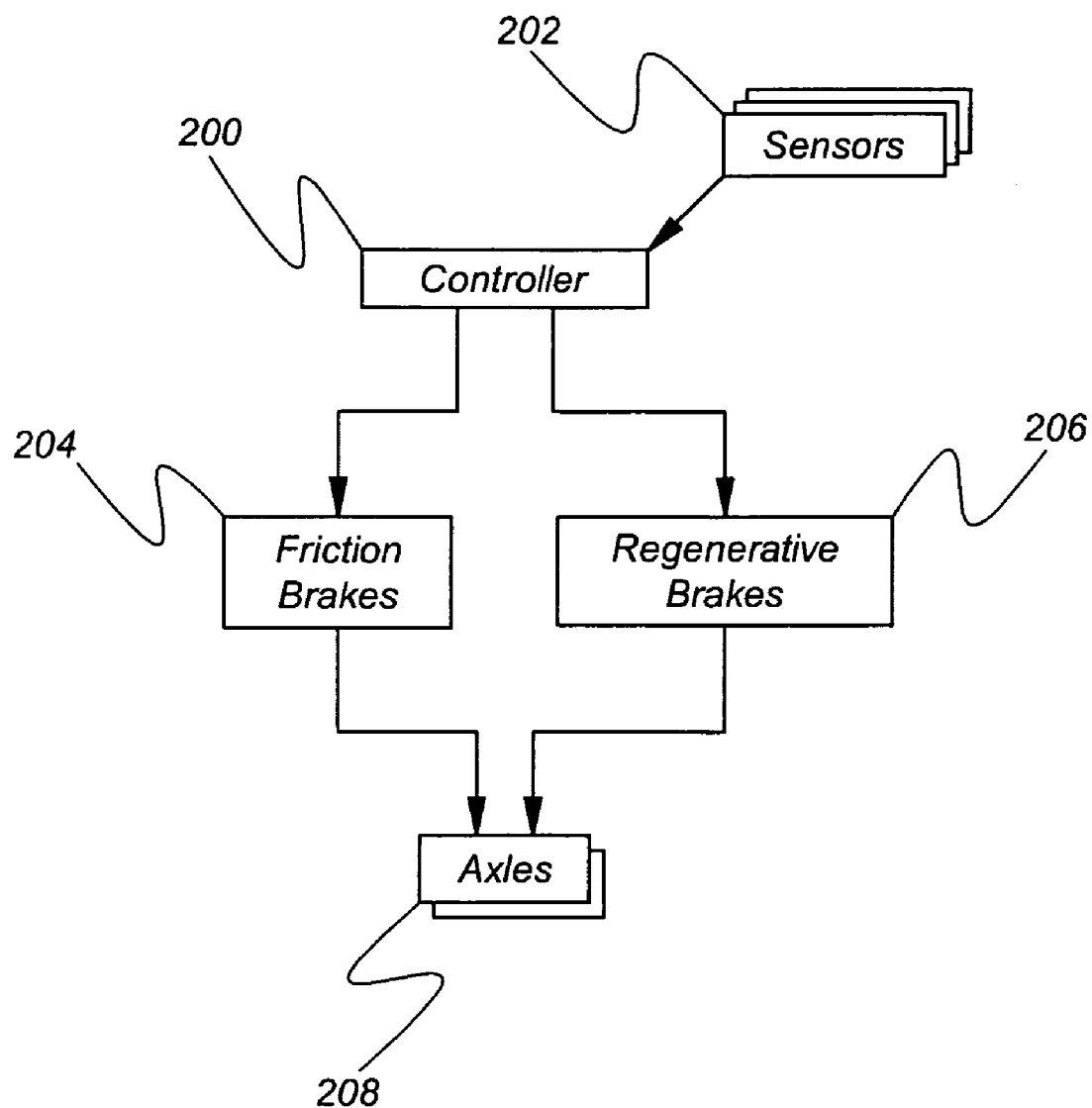
FIG. 1 is a schematic representation of a braking system according to the present invention.

As shown in FIG. 1, a multiple axle regenerative braking system according to the present invention is operated by controller 200 which comprises a micro-processor controller drawn from the class of vehicle power train controllers known to those skilled in the art and suggested by this disclosure. Controller 200 operates friction brakes 204 and regenerative brakes 206. The regenerative braking equipment includes reversible traction motor/generators and associated batteries or other energy storage devices such as an ultracapacitors. Alternatively, the regenerative braking equipment may include a hydraulic wheel motor/pump which regeneratively charges a hydraulic accumulator. In any event, axles 208 are braked both by the friction brakes 204 and regenerative brakes 206.

Figure 2:
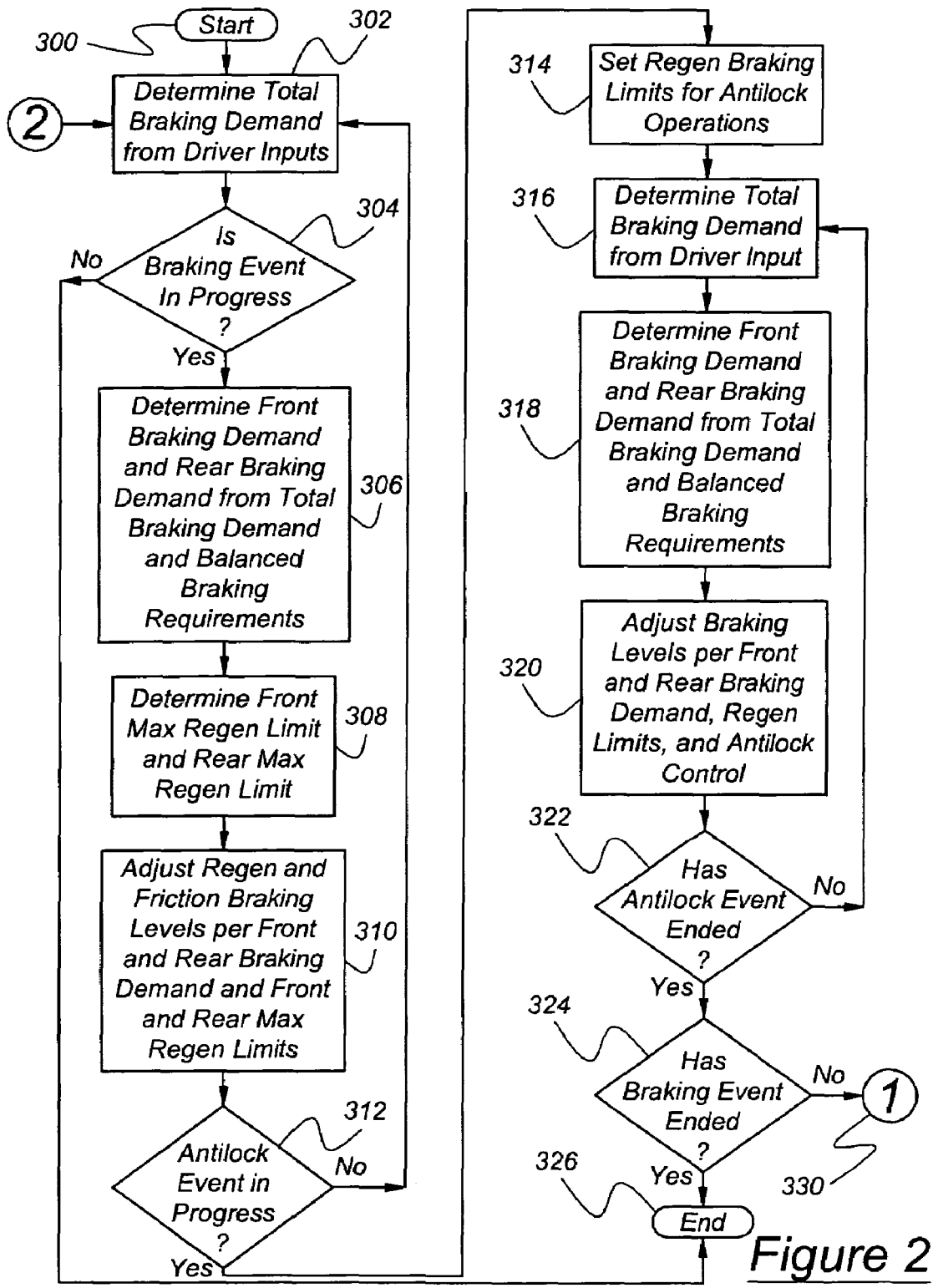
FIG. 2 is a block diagram of a method according to the present invention.
Figure 2A:
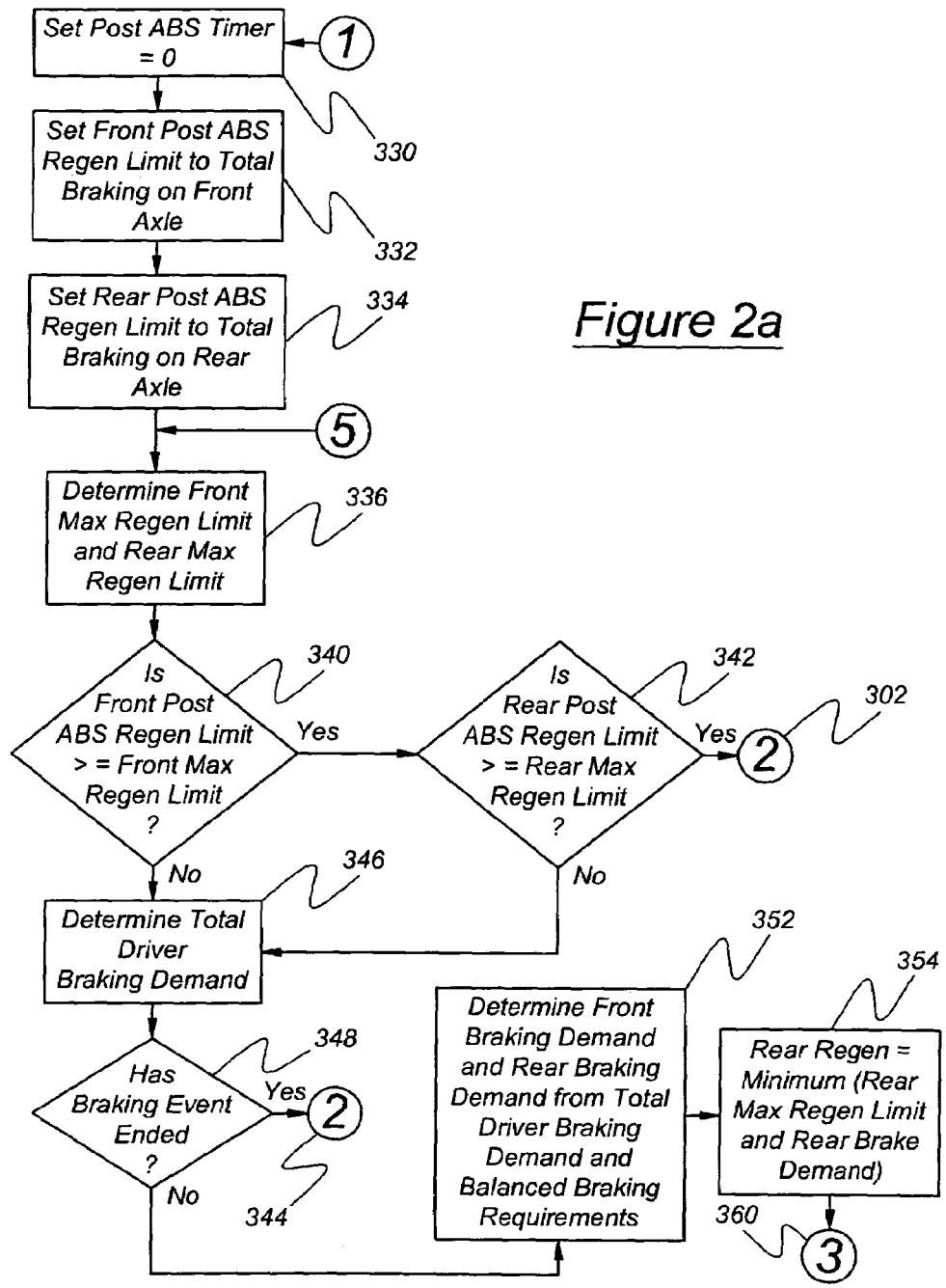
Figure 2B:
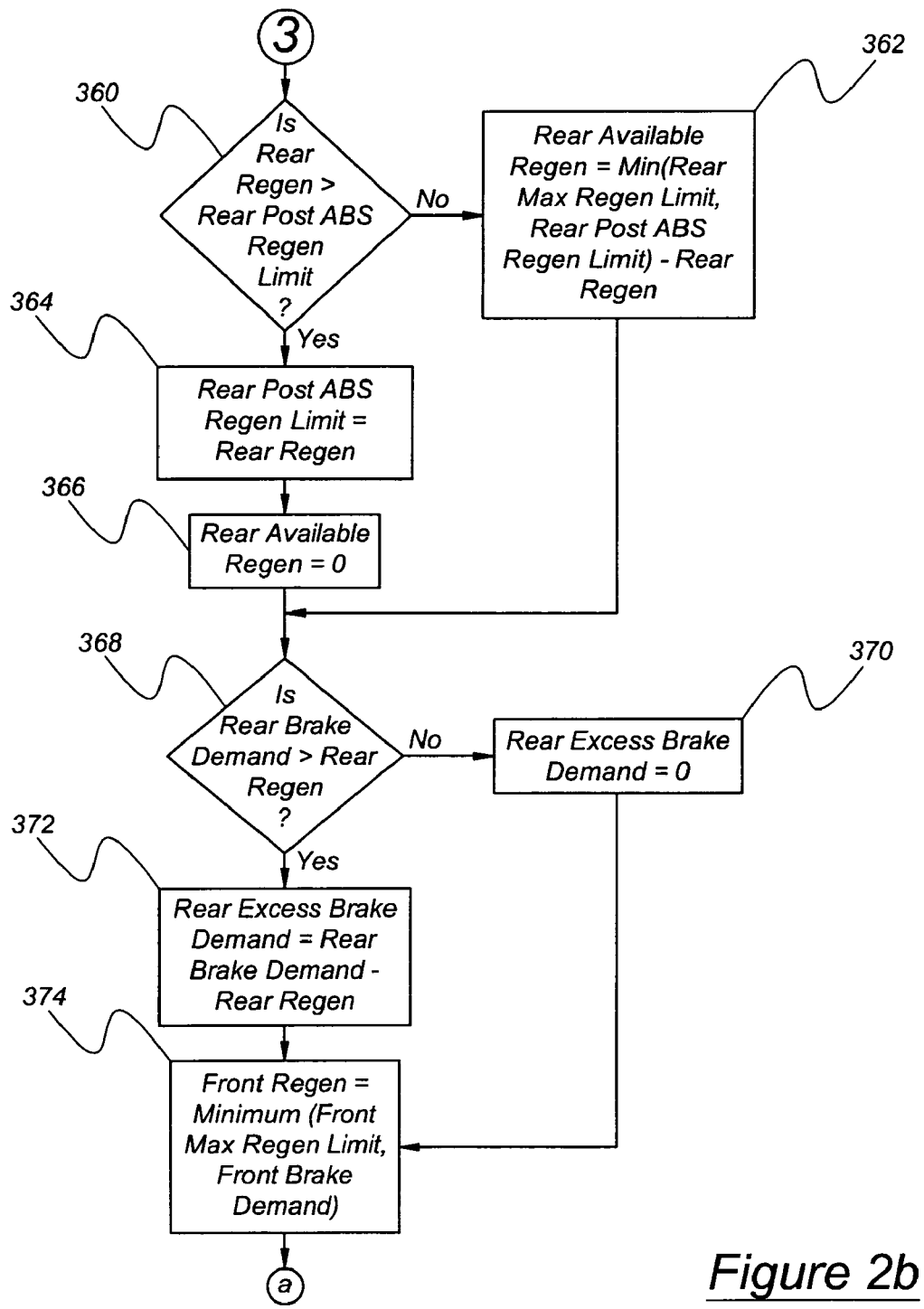
Figure 2C:
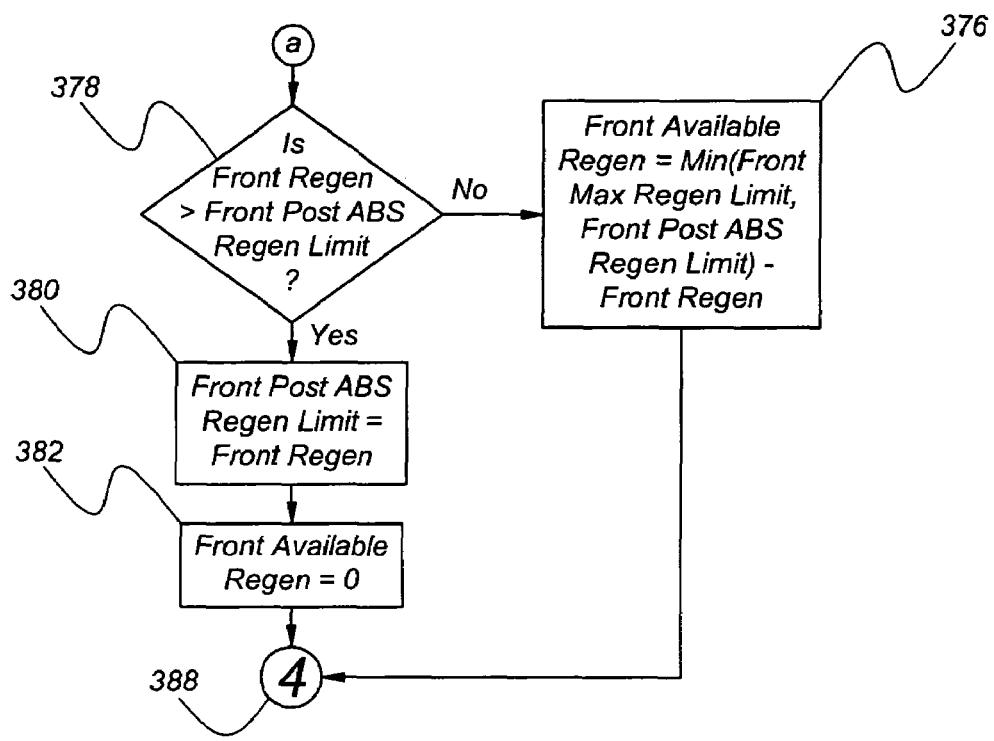
Figure 2D:
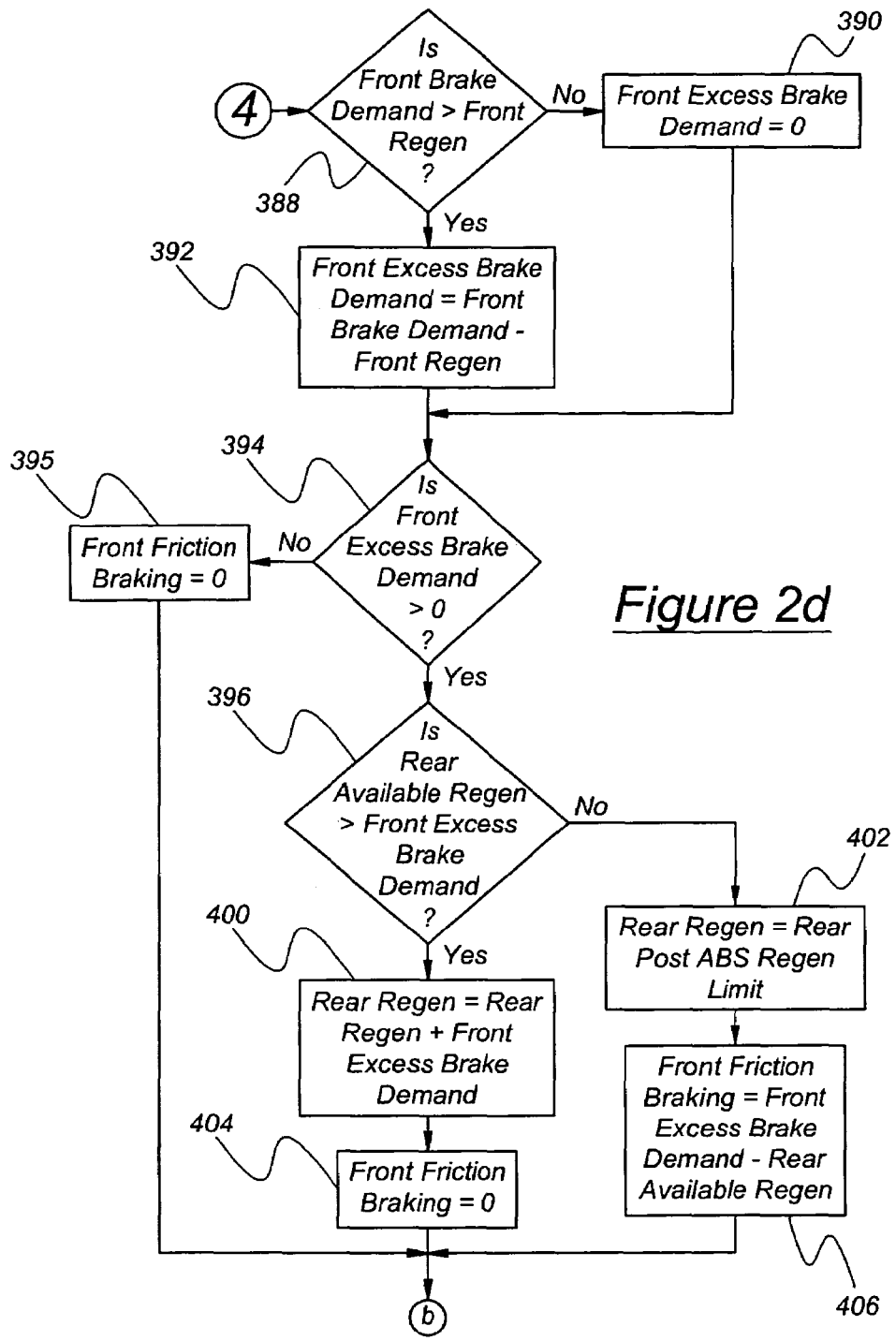
Figure 2E:
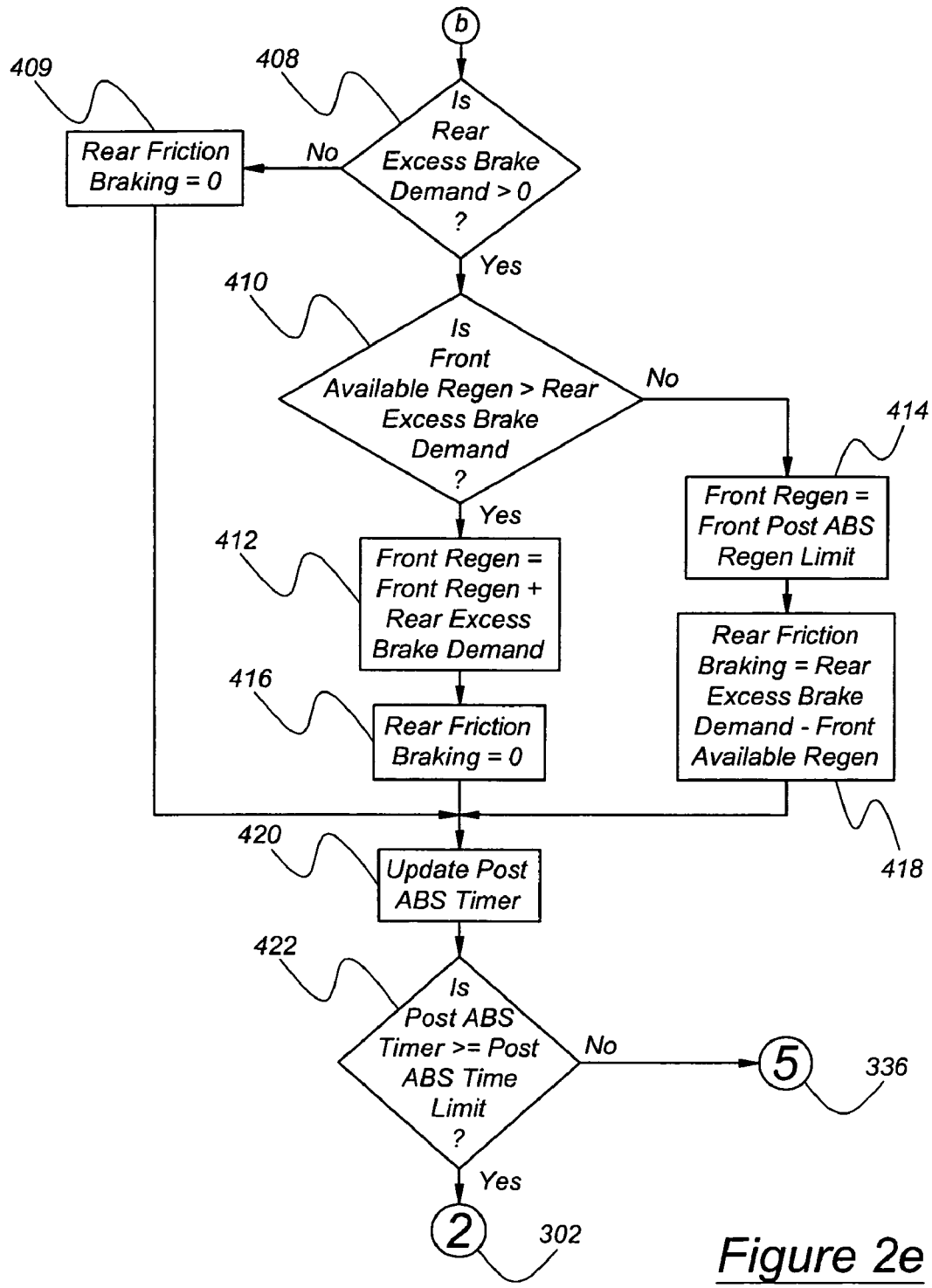

A method according to present invention is shown in FIG. 2. Beginning at start block 300, controller 200 moves to block 302 wherein total braking demand is determined from driver inputs. In general, the determination of brake demand relies on input from one or more sensors 202, such as a brake pedal position sensor, a brake pedal force sensor, and an accelerator position sensor. Such sensors are known to those skilled in the art and suggested by this disclosure. For example, when the vehicle's driver has lifted his/her foot from the accelerator, it may be inferred that the driver wishes to cause the vehicle to slow. This is an element of brake demand. Another element is brake pedal position. Another may be the rate of change of brake pedal position.

At block 304, controller 200 determines whether a braking event is in progress. If the answer is "no" at block 304, the routine ends at block 326. If, however, the answer is "yes" at block 304, the routine moves to block 306, wherein the front braking demand and rear braking demand are determined from the total braking demand and balanced braking requirements. The reader will recall that the total braking demand was determined at block 302 from inputs provided by the vehicle's driver. Balanced braking requirements dictate that during normal conditions, due to the fact that wheel loadings from static vehicle weight distribution and dynamic distribution often vary from the front to rear of the vehicle, the same amount of brake torque cannot be applied to each of the axles of the vehicle. Balanced braking occurs when brake torques are applied in accord with the wheel loading for each axle of the vehicle. Thus, at block 306 controller 200 determines the front braking force to be developed and rear braking force to be developed. At the core of the present invention is the notion that these balanced braking torques are only a guideline, because the presence or absence of sufficient regenerative capacity to meet the balanced braking requirement for a particular axle may cause an application of regenerative braking at a level which is more or less than the balanced braking torque.

At block 308, controller 200 determines a front maximum regenerative braking limit and a rear maximum regenerative braking limit. These limits are system limits which are dictated by the current battery charge, ambient temperature, battery temperature, the capacity of the rotating machine, the transmission means between the road wheels of a particular axle and the associated electric machine, and other variables known to those skilled in the art and suggested by this disclosure. The front and rear maximum regenerative limits set the maximum regenerative braking capacity for a particular axle. At block 310, the regenerative and friction braking levels are adjusted for both the front and rear axles, based upon the front and rear braking demand and maximum regeneration limits.

At block 312, controller 200 inquires as to whether an anti-lock braking event is in progress. If the answer at block 312 is "no", the routine returns to block 302. If, however, the answer is "yes" at 312, the routine moves to block 314, wherein regenerative braking limits are set for anti-lock operation. The regenerative braking limits are in general, the amount of braking force which may be achieved without interfering with anti-lock operation. This may be determined by recording the brake torques during the immediate prior antilock braking event.

At block 316, controller 200 once again determines the total braking demand from driver input in the manner described in connection with block 302. Then, the routine moves to block 318, wherein the front braking demand and rear braking demand are once again determined from total braking demand and balanced braking requirements as in block 306. Then, continuing to block 320, controller 200 adjusts friction and regenerative braking levels according to the front and rear braking demand and the regenerative limits and the anti-lock control limits. In general, this means that the vehicle will be braked according to the driver's desire as dictated by the front and rear braking demand and balanced braking requirements, but consistent with the regenerative braking limits and further the limits necessitated by the avoidance of locked road wheels.

At block 322, controller 200 inquires as to whether the anti-lock event has ended. If the answer is "no", the routine returns to block 316 and continues. If however, the answer is "yes" at block 322, the controller continues to block 324 wherein the status of the braking event is inquired into. If there is no braking occurring, the strategy ends at block 326. If however, if braking is continuing, the strategy moves to 330 where a post-ABS timer is set equal to zero. This means that although the ABS event has ended, braking is continuing. Then, turning to block 332, controller 200 sets the front brake post-ABS regenerative limit to the total braking of the front axle at the cessation of the ABS event. This means that the ABS-consistent regenerative braking limit is set equal to the contemporaneous total braking i.e. friction braking and regenerative braking on the front axle. Then, the routine moves to block 334 wherein the post-ABS, or following-ABS regenerative limit for the rear axle is set equal to the total braking on the rear axle. Then, the routine moves to block 336 wherein the front maximum regenerative limit and rear maximum regenerative limit are determined as before, consistent with system considerations such as battery temperature and state of charge, the capacity of the motor/generator, and the power transmission connecting the road wheels and the motor/generator.

After block 336, controller 200 moves to block 340 wherein a question is asked regarding the front axle post-ABS regenerative limit versus the front brake system maximum regenerative limit. If the front post-ABS regenerative limit is greater than or equal to the front max regen limit, and the answer is "yes" at block 340, controller 200 moves to block 342, wherein the rear post-ABS regen limit is compared with the rear max regen limit. If the rear post-ABS regen limit is greater than or equal to the rear max regen limit, the answer is "yes" at block 342, and controller 200 continues to point 350 which leads to block 302 and continues. If however, the answer is "no" at block 342 or at block 340, controller 200 moves to block 346, where total driver braking demand is once again determined as at block 302. Then, controller 200 moves to block 348, wherein the status of the braking event is determined. If the braking event has ended, controller 200 moves at point 344 to point 302 and continues. If however, the braking event has not ended at block 348, the answer is "no" at block 348, and controller 200 moves to block 352, wherein the front braking demand and the rear braking demand are determined from total driver braking demand and balanced braking requirements as at block 306. Then, controller 200 moves to block 354, wherein rear regen is determined as the minimum value of rear maximum regen limit which is the previously described system limit, and the rear brake demand. Then, at block 356 controller 200 moves to point 358 and then to block 360. At block 360, the rear regen value is compared with the rear post-ABS limit. If the rear regen value is greater than the rear post-ABS limit, controller 200 moves to block 364, wherein the rear post-ABS regen limit is reset to the value of the rear regen. Thus, the rear post-ABS limit may be increased according to driver demand and balanced braking requirements so as to maximize regenerative capability. Then, at block 366 rear available regen is set equal to zero.

If the answer is "no" at block 360, controller 200 moves to block 362, wherein the rear available regen is set to the minimum value of the rear max regen limit and the rear post-ABS regen limit, minus the rear regen value. Although it appears that the post-ABS regen limit can never exceed the max regen limit, the max regen limit may drop below the post-ABS regen limit due to slowing of the vehicle. If the answer at block 360 is "yes", controller 200 moves to block 364, where the rear post ABS regenerative braking limit is set equal to the previously determined rear regen value. Then, at block 366, the rear available regen is set equal to zero.

At block 368, controller 200 compares rear brake demand with the current rear regen value. If rear brake demand is greater than rear regen, the answer is "yes" at block 368 and at block 372 rear excess brake demand is calculated as rear brake demand minus the rear regen value. A positive value for rear excess brake demand means that the desired rear braking cannot be satisfied by the rear axle regenerative braking. If the answer at block 368 is "no", this means that rear brake demand is less than rear regenerative capability and the rear excess brake demand equals zero.

At block 378, controller 200 compares the current front regenerative braking value with the front post-ABS regen limit. If the front regen value is greater than front post-ABS limit, the answer to the question at block 378 is "yes", and at block 380 controller 200 sets the front post-ABS regen limit equal to the front regen amount. Then, at block 382 the front available regen is set equal to zero. If however, the answer to the question posed at block 378 is "no", the front available regen is set equal to the minimum of a first group of values consisting of the front max regen limit and the front post-ABS regen limit. This minimum is then debited by the amount of the front regen to develop the value of the front available regen. Then, the routine moves to block position 4 at 384, then at 386 controller continues at block 388, wherein the front brake demand is compared with the front regen. If the front demand is greater than the front regen, the answer is "yes" at block 388 and controller 200 moves to block 392, wherein the front excess brake demand is set equal to front brake demand minus front regen. If however, the question posed at block 388 is "no", front excess brake demand is set equal to zero at block 390. In either event, controller 200 continues to block 394 where a question is asked regarding the magnitude of front excess brake demand. If the demand is less than or equal to zero, the front friction braking is set to zero at block 395. If however, the front excess brake demand is greater than zero a question is posed at block 396 regarding the rear available regen as compared with front excess brake demand. If rear available regen is greater than front excess brake demand, rear regen is set at block 400 to the previous value of rear regen plus front excess brake demand, and at block 404 front friction braking is set equal to zero. In other words, at block 400 rear regenerative braking is set equal to previous value of rear regenerative braking plus the front excess brake demand. If the answer to the question posed at block 396 is "no", rear regen is set equal to the rear post ABS regen limit at block 402 and the routine moves to block 406 wherein the front friction braking is set equal to front excess brake demand minus the rear available regenerative value.

If rear regen is set equal to the prior value of rear regen plus front excess brake demand at block 400, controller 200 sets front friction braking equal to zero at block 404. Then, the routine continues at block 408, wherein rear excess brake demand is compared to a null value. If rear excess brake demand is greater than zero, controller 200 moves to block 410 wherein front available regen is compared with rear excess brake demand. If the front available regenerative braking is greater than rear excess brake demand, controller moves to block 412 wherein front regenerative braking is set equal to previous value of front regenerative braking plus rear excess brake demand. If, however the answer is "no" at block 410, controller 200 moves to block 414 wherein front regen is set equal to front post ABS regen limit and then, at block 418 rear friction braking is set equal to rear excess brake demand minus front available regen.

At block 416, controller 200 sets rear friction braking equal to zero in the event that front regen is reset at block 412. Rear friction braking will also be set equal to zero at block 409 in the event that a negative response is issued at block 408. In block 420, the post ABS timer is updated and at block 422 if the post ABS timer has reached the time limit, the routine moves back to normal braking at block 302 via point 426. If however, the post ABS timer has not run its course, at point 424 the routine will be returned to block 336 for further operations.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. A method for operating regenerative braking in an automotive vehicle having a plurality of axles, comprising the steps of:
   determining a brake demand for a first axle;
   determining the availability of regenerative braking of said first axle to satisfy said brake demand;
   determining a brake demand for a second axle;
   determining the availability of regenerative braking of said second axle to satisfy the braking demand for said second axle; and
   in the event that regenerative braking available for the first axle is greater than the brake demand for the first axle, and in the further event that the regenerative braking available for the second axle is less than the braking demand for the second axle, applying any surplus regenerative braking to the first axle in an amount not greater than the amount needed to satisfy any unmet braking demand for the second axle.

2. A method according to claim 1, further comprising the step of applying friction braking to the second axle in the event that the surplus regenerative braking available with the first axle is insufficient to satisfy the braking demand for the second axle when combined with the regenerative braking available with the second axle.

3. A method according to claim 1, wherein the brake demand for the first axle and the brake demand for the second axle are determined according to inputs from a driver of the vehicle and from balanced braking requirements.

4. A method according to claim 1, wherein the availability of regenerative braking for an axle of said vehicle is determined by comparing at least one regenerative braking limit with the lesser of the brake demand for said axle and a maximum regenerative braking which may be achieved by the axle.

5. A method according to claim 4, wherein said at least one regenerative braking limit comprises the lesser of the maximum regenerative braking which may be achieved by the axle and a calculated maximum braking amount following the end of an antilock braking event (post ABS braking amount).

6. A method according to claim 5, wherein a post-ABS braking limit for any particular axle is periodically updated by setting said regenerative braking amount equal to the total braking on said any particular axle.

7. A method according to claim 1, further comprising the steps of:
   determining the brake demand for said first axle;
   determining the availability of regenerative braking of said first axle to satisfy said brake demand;
   determining the brake demand for said second axle;
   determining the availability of regenerative braking of said second axle to satisfy the braking demand for said second axle;
   in the event that the regenerative braking available for said second axle is greater than the brake demand for said second axle, and in the further event that the regenerative braking available for said first axle is less than the braking demand for said first axle, applying the surplus regenerative braking to said second axle in an amount not greater than the amount needed to satisfy any unmet braking demand for said first axle; and
   applying friction braking to said first axle in an amount sufficient to satisfy the brake demand of the first axle in the event that the surplus regenerative braking available with the second axle is insufficient to satisfy the brake demand for the first axle when combined with the regenerative braking available with the first axle.

8. A control system for operating regenerative and friction brakes on a plurality of axles of an automotive vehicle, comprising:
   a plurality of sensors for providing a plurality of outputs corresponding to a plurality of vehicle operating parameters;
   a controller for receiving inputs from said plurality of sensors; and
   an operating system, within said controller, for determining a unique brake demand for each of said plurality of axles, and for determining the regenerative braking available for each axle, with said controller applying regenerative braking to a firs one of said axle in an amount greater than the brake demand for said first axle in the event that surplus regenerative capacity is present for the first axle and insufficient regenerative braking is available to meet the brake demand for a second one of said axles.

9. A control system according to claim 8, wherein said controller applies friction braking to said second axle in the event that the sum of the first axle surplus regenerative capacity and the second axle regenerative braking is less than the brake demand for said second axle.

* * * * *